United States Patent
Daniel et al.

(10) Patent No.: US 6,863,563 B2
(45) Date of Patent: Mar. 8, 2005

(54) ELECTRIC CONNECTOR FOR THE MOTOR OF A HERMETIC COMPRESSOR

(75) Inventors: Joao Carlos Dobner Daniel, Joinville-SC (BR); Junior Landoaldo Victor Lindroth, Joinville-SC (BR); Emerson Moreira, Joinville-SC (BR); Orlando Starke, Joinville-SC (BR)

(73) Assignee: Empresa Brasileira de Compressores S.A. Embraco, Joinville (BR)

( * ) Notice: Subject to any disclaimer, the term of this patent is extended or adjusted under 35 U.S.C. 154(b) by 0 days.

(21) Appl. No.: 10/450,587

(22) PCT Filed: Dec. 11, 2001

(86) PCT No.: PCT/BR01/00152

§ 371 (c)(1),
(2), (4) Date: Aug. 8, 2003

(87) PCT Pub. No.: WO02/49186

PCT Pub. Date: Jun. 20, 2002

(65) Prior Publication Data

US 2004/0063355 A1 Apr. 1, 2004

(30) Foreign Application Priority Data

Dec. 13, 2000 (BR) .............................................. 0006484

(51) Int. Cl.$^7$ ................................................. H02K 5/22
(52) U.S. Cl. .......................................... 439/577; 310/71
(58) Field of Search ............................. 439/577; 310/71

(56) References Cited

U.S. PATENT DOCUMENTS

| | | | | |
|---|---|---|---|---|
| 4,130,331 A | * | 12/1978 | Neff et al. ................... | 439/396 |
| 4,685,201 A | * | 8/1987 | Boyd, Jr. ..................... | 439/451 |
| 4,999,532 A | * | 3/1991 | Bartell ........................ | 310/71 |
| 6,300,698 B1 | * | 10/2001 | Fargo et al. .................. | 310/71 |

FOREIGN PATENT DOCUMENTS

| | | | | |
|---|---|---|---|---|
| EP | 0 004 423 | 10/1979 | | |
| EP | 0 467 041 | 1/1992 | | |
| EP | 0 837 542 | 4/1998 | ................... | 310/71 |
| GB | 2 350 405 | 11/2000 | | |

OTHER PUBLICATIONS

Patent Abstracts of Japan, vol. 006, No. 254 (E–148), Dec. 14, 1982, JP 57 153546 A (Tokyo Shibaura Denki KK), Sep. 22, 1982, abstract, figures 1–3.

* cited by examiner

*Primary Examiner*—Renee Luebke
(74) *Attorney, Agent, or Firm*—Darby & Darby

(57) ABSTRACT

An electric connector for the motor of a hermatic compressor, comprising an electric insulating body seated against the stack of lamination (6) of the stator of the electric motor, and carrying a plurality of binding posts (22), which receive and affix respective wires from the coil windings (7) of said stator of the electric motor; contact terminals, eletrically connected to the binding posts (22), and which will be connected to the hermetic compressor, by respective conductors (30); and at least one fixation means (23), which is fitted and immobilized in a retaining bore (11) provided in the stack of lamination (6) of the stator.

8 Claims, 4 Drawing Sheets

ELECTRIC CONNECTOR FOR THE MOTOR OF A HERMETIC COMPRESSOR

CROSS REFERENCE TO PRIOR APPLICATIONS

This is a U.S. national phase application under 35 U.S.C. §371 of International Patent Application No. PCT/BR01/00152 filed Dec. 11, 2001. The International Application was published in English on Jun. 20, 2002 as International Publication No. WO 02/49186 A2 under PCT Article 21(2).

FIELD OF THE INVENTION

The present invention refers to an electric connector for the electric motor of a hermetic compressor of the type used in refrigeration appliances, such as refrigerators, freezers, water fountains, etc., for connecting inside the hermetic shell of the compressor the coils of the electrical motor to a power inlet plug provided in the shell of the compressor.

BACKGROUND OF THE INVENTION

The motor of a hermetic compressor usually comprises, mounted inside its hermetic shell, a rotor and a stator, the latter being formed by a main coil and a secondary coil, said motor being fed by an electric current from a power source external to said hermetic shell, by connecting an appropriate wiring to a power inlet plug, mounted externally to the hermetic shell and which is electrically connected to the stator of the electric motor.

In a known construction, in order to connect the stator to the power inlet plug of the hermetic shell through the interior of the latter, some copper wires of the stator, generally three, are connected to a cable by clamping a metallic piece, joining each copper wire to the cable, which is then connected to the shell. After clamping the two parts together, for each wire, the formed assembly receives a thermal retractible insulating cover, which protects said connection thus obtained. After the connection, the whole assembly is positioned inside the coils that form the motor.

This construction presents some disadvantages, such as difficult automation, for example in the clamping steps, which also results in low quality of the obtained electric connections, with a high number of defects and rejections, for example due to low efficiency of the intended connection and to failures in the process for obtaining said connection.

In another known construction, the electric connections of the motor to the shell of the compressor occur through an electric connection device, which receives each copper wire from the motor coils to be electrically connected to the shell of the compressor, and which lodges each of said wires in a respective contact cradle. While this solution allows for automation and improves the quality of the electric connections between the motor and the hermetic shell of the compressor, as compared to the electric connections obtained by clamping, the known constructions for an electric connection device present deficiencies in relation to the form of retaining said devices inside the hermetic shell of the compressor.

In one of the known solutions for affixing the electric connection device inside the hermetic shell of the compressor, one of the parts which forms said device and which is provided with teeth is affixed, by interference, in the stator of the electric motor. In another known solution, the part to be affixed to the stator is provided with flanges, which are fitted into a portion of the stator, before fastening thereof.

In the first fixation option, the disadvantages reside in the fact that the fixing means is easily broken, due to aging of the material, generally plastic, and the possibility of occurring relative movements between the electric connection device and the stator wire, which can lead, with time, to material fatigue.

Moreover, this construction allows the occurrence of undesired vibrations in the connection. In the second fixation option, the disadvantages result from the fact that, for each flange of the electric connection device to be fastened to the stator, there is loss of a fastening point thereof. In the known fixations, three fastening points of the stator are lost with this process.

SUMMARY OF THE INVENTION

Thus, it is an object of the present invention to provide an electric connector for the motor of a hermetic compressor, which allows a safe and strong fixation thereof to said electric motor, without the disadvantages of occurring ruptures or fatigue, or impairing the fastening of the stator.

It is a further object of the present invention to provide an electric connector with the characteristics mentioned above, which allows obtaining the desired electric connection in a substantially automatized form.

These and other objects are attained by an electric connector for the motor of a hermetic compressor, said motor being mounted inside a hermetic shell and comprising a stator formed by a stack of overlapped laminations lodging coil windings, said shell carrying a power inlet plug to be connected to a current supply source, said electric connector comprising an electric insulating body, seated against the stack of laminations of the stator and carrying: a plurality of binding posts, which receive and affix respective wires of the coil windings; contact terminals, electrically connected to the binding posts and which will be connected to the power inlet plug of the shell by respective conductors; and at least one fixing means, which is fitted and immobilized in a retaining bore provided in the stack of laminations of the stator.

BRIEF DESCRIPTION DRAWINGS

The invention will be described below, with reference to the enclosed drawings, in which.

DESCRIPTION OF THE ILLUSTRATED EMBODIMENT

Figure 1:
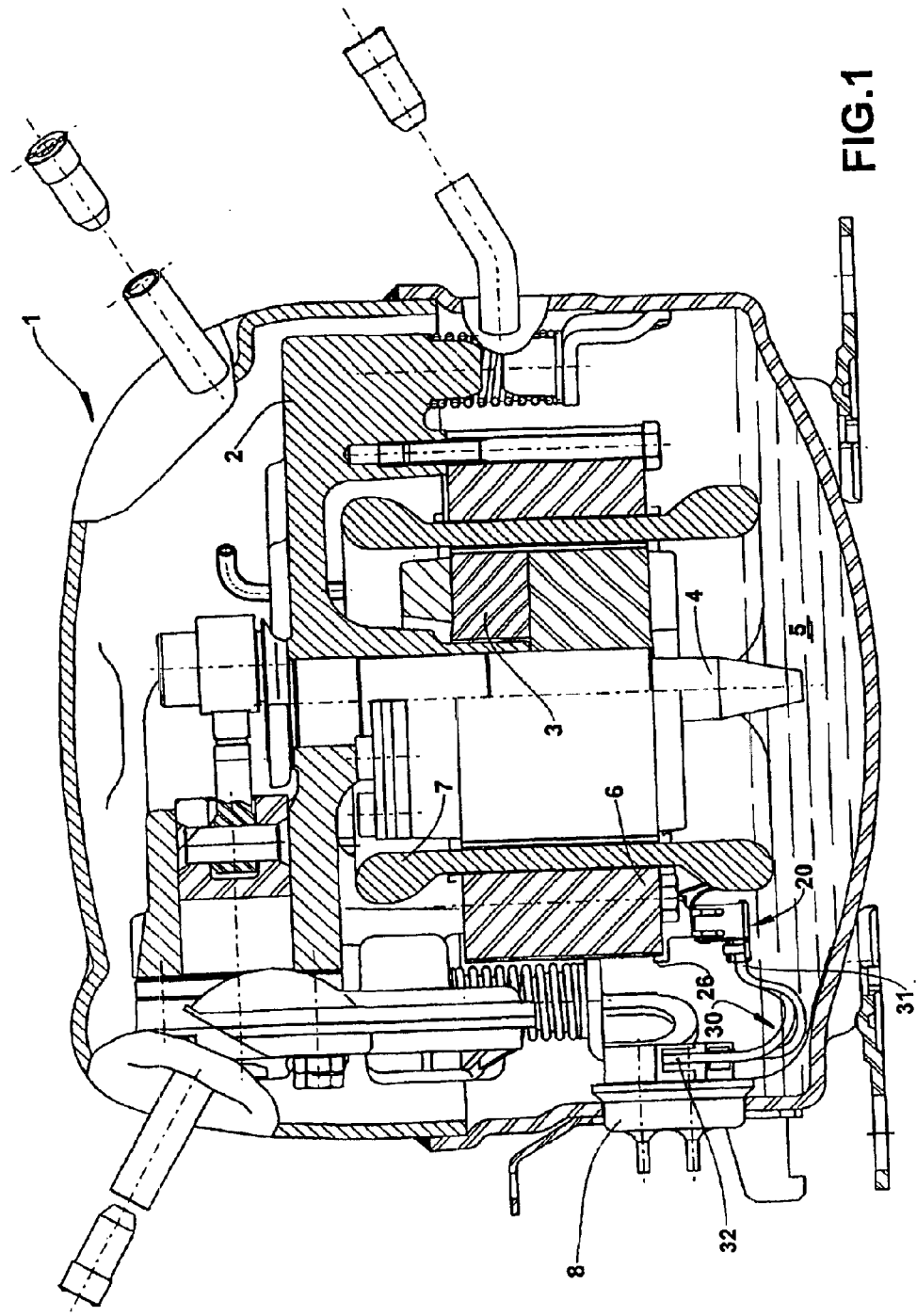
FIG. 1 shows, schematically, a longitudinal diametrical sectional view of a hermetic compressor of the reciprocating type with a vertical shaft, presenting an electric connection between the motor and the shell of the compressor, using the electric connector of the present invention.
Figure 2:
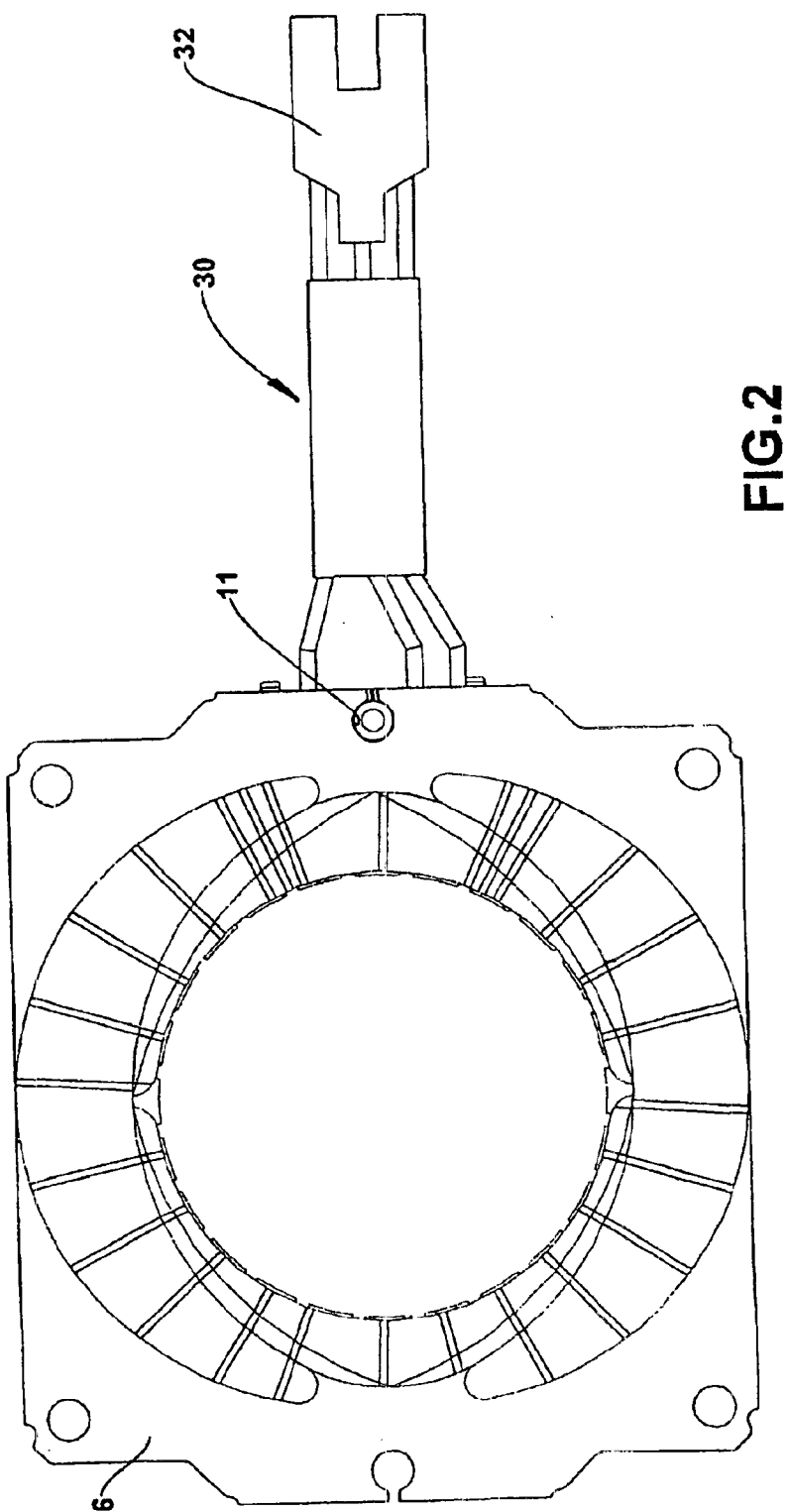
FIG. 2 shows, schematically, an upper view of the stator of the electric motor, the windings of said stator and the wires for electrically connecting the windings being prepared for connecting the hermetic shell of the compressor, according to the prior art.
Figure 3:
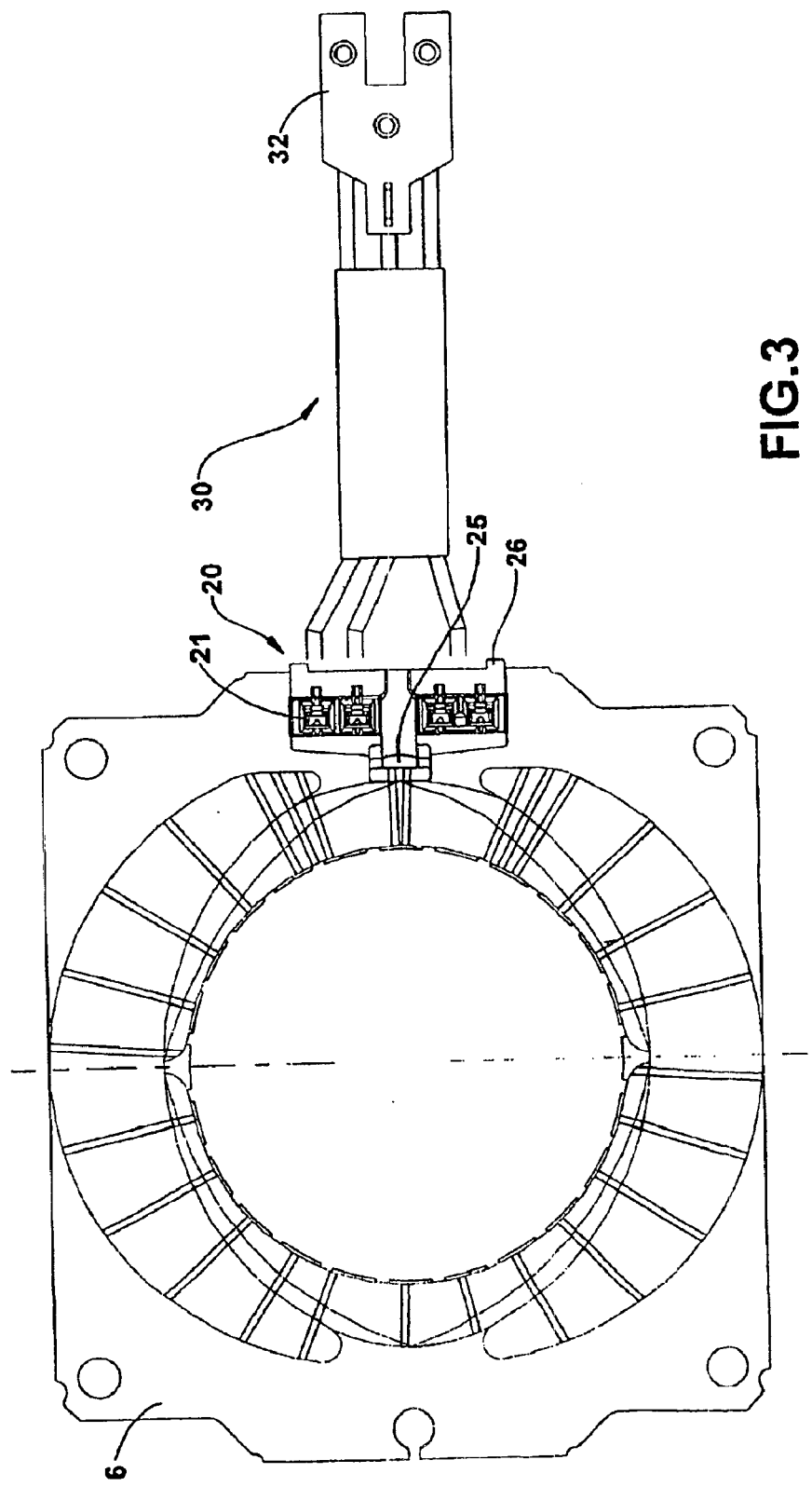
FIG. 3 shows, schematically, a lower view of the stator of the electric motor, presenting the stator, the windings of said stator and the wires for electrically connecting the windings being prepared for connecting the hermetic shell of the compressor, using the electric connection of the present invention.
Figures 4, 5:
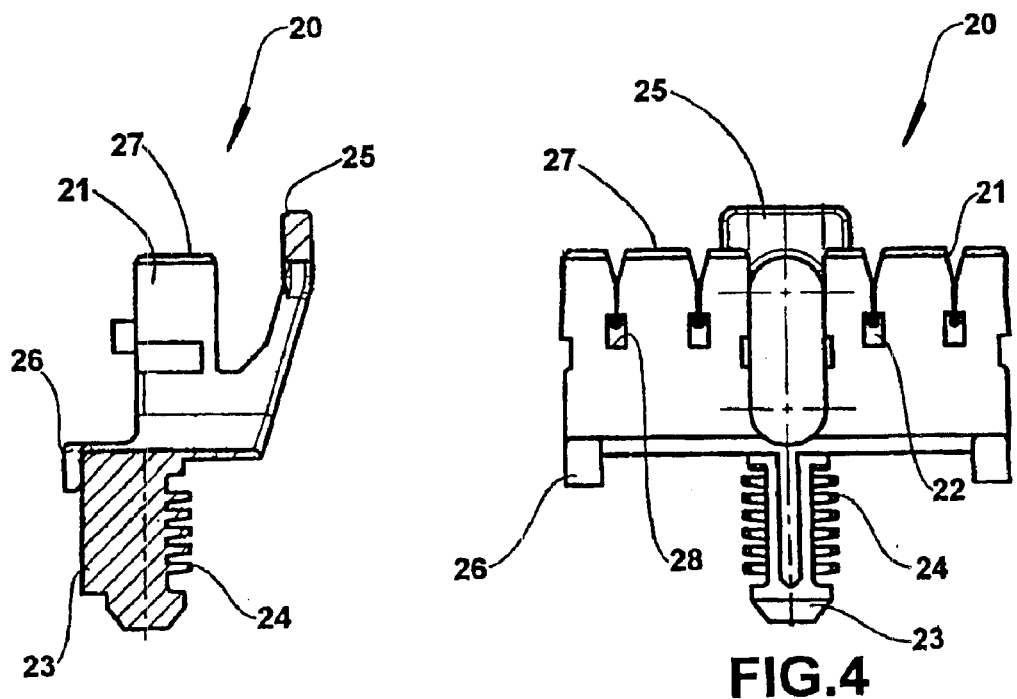
FIG. 4 shows, schematically, a front view of the electric connector of the present invention, before its assembly to the stator.
FIG. 5 shows, schematically, a lateral longitudinal sectional view of part of the electric connector of the present invention.
Figure 6:
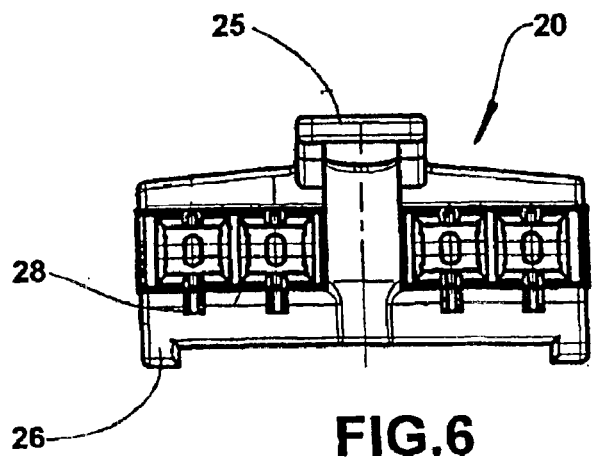
FIG. 6 shows, schematically, and in an upper view, the electric connector of the present invention.

The present invention will be described now in relation to a reciprocating compressor used in refrigeration systems and of the type having a vertical shaft (FIG. 1), comprising a hermetic shell 1, inside which is suspended, in an appropriate manner, for example by springs, a motor-compressor assembly formed by a cylinder block 2, to which is affixed an electric motor, whose rotor 3 is fixedly mounted to a vertical crankshaft 4 supported on a main bearing, which is machined in the cylinder block 2.

The crankshaft 4 sustains, at the lower portion thereof, a pump rotor, which carries oil from an oil sump 5 to the parts of the cylinder block 2 requiring lubrication during the operation of the compressor.

The electric motor of the compressor comprises, besides the rotor 3, a stator formed by a stack of laminations 6, which are metallic and in overlapped alignment, so as to define axial housings to receive coil windings 7 from the electric motor.

The electric motor is fed with current from an appropriate and not illustrated current source, by electrically connecting said current source with a power inlet plug 8, carried by the shell 1 and which is electrically connected to the electric motor of the compressor.

According to the present invention, the stator carries, fixedly seated against its stack of laminations 6, for example in one of the end laminations thereof, an electric connector 20, to be described ahead and which, by means of conductors 30, electrically connects the electric motor of the compressor to the power inlet plug 8.

The electric connector 20 of the present invention comprises an electric insulating body, which defines a plurality of housings 21, each carrying a binding post 22, which receives and affixes respective wires of the coil winding 7, said electric insulating body carrying contact terminals, electrically connected to the binding posts 22, and which will be connected to the power inlet plug 8 of the shell 1 by respective conductors 30, such as for example a conventional wiring, having a first end 31, for connecting the electric connector 20 of the present invention, and a second end 32, for connecting the power inlet plug 8 of the compressor.

The electric connector 20 of the present invention further comprises, carried by its electric insulating body, for example incorporated or retained therein, at least one fixing means 23 to be fitted, for example by interference, into a retaining bore 11 provided in the stack of laminations 6 of the stator, in order to be immobilized in relation to the latter, when introduced into said retaining bore 11.

According to a way of carrying out the invention, the retaining bore 11 is a bore made during manufacture, already existing in the stack of laminations 6 when the present electric connector 20 is installed, and which is axially defined in said stack of laminations 6, externally to the housings that receive the coil windings 7, during production of said stack of laminations 6, said retaining bore 11 having a certain diameter, which is previously calculated so as not to interfere with the metallic mass of the stack of laminations 6.

The illustrated fixing means 23 is in the form of a projection, inferiorly extending from a portion of the insulating body of the electric connector 20 of the present invention, and which is provided with extensions of external circumferential ribs 24, along a substantial portion of the axial extension of said projection, said external circumferential ribs 24 being parallel and aligned to each other and resiliently flexible, in order to be introduced into the retaining bore 11. The external circumferential ribs 24 define, for the fixing means 23, a diameter that is superior to that of the retaining bore 11, in order that, after introducing the projection inside the retaining bore 11, the efforts to remove said projection will require a modification, in the angular positioning of the external circumferential ribs 24, which surpasses the diameter of the retaining bore 11, thus immobilizing the present electric connector 20 in relation to the stator.

According to the present invention, the electric connector 20 presents, carried by the electric insulating body, a support stop 25, angularly projecting from a rear portion of said insulating body, and which will be seated on an adjacent portion of the coil windings 7 of the stator, upon fixation of the present electric connector 20 to the stack of laminations 6 of said stator, said support stop 25 being, for example, fastened to said coil windings 7 upon fastening of the latter.

The support stop 25 is a constructive option, which allows the present electric connector 20 to be more safely retained to the stator, and which, even though being fastened to the coil windings 7 of the stator, only suppresses two points of the fastening thereof, which points are used for fastening said electric connector 20 to the stator.

The electric insulating body of the present electric connector 20 further has at least one front flange 26, defining a guide for positioning the connector in relation to the stack of laminations 6, and which will be seated against an adjacent external wall portion of the stack of laminations 6 of said stator.

According to the illustrations, the insulating body of the electric connector 20 of the present invention defines, close to the housings 21 that receive the binding posts 22, the electric contact terminals, which connect the electric terminals of the first end 31 of the electric conductor 30 to be connected to the power inlet plug 8 of the shell 1 of the compressor. According to the illustrations, the housings 21 for contacting the present electric insulating body are of the type having an upper inlet 27 with a "V" profile, whose vortex portion opens to a cradle 28, which receives a wire portion of the coil winding 7, retaining said wire portion and avoiding movement thereof, as well as avoiding possible ruptures due to fatigue resulting from vibrations of the compressor during operation thereof.

What is claimed is:

1. A device comprising:
    a motor of a hermetic compressor; said motor including a stator formed by a stack of laminations, which are overlapping and lodge coil windings
    a hermetic shell containing said motor therein; said shell carrying a power inlet plug for connection to a current supply source; and
    an electric connector comprising an electric insulating body, seated against the stack of laminations of the stator, said electric connector further includes:
        a plurality of binding posts which receive and affix respective wires from the coil windings;
        contact terminals, electrically connected to the binding posts and which are configured to connect to the power inlet plug of the shell, by respective conductors;

at least one fixing means, which is fitted and immobilized in a retaining bore provided in the stack of laminations of the stator, said fixing means is a projection having external circumferential ribs; and a support stop coupled to the electric insulating body, and which is configured to be seated on an adjacent portion of the coil windings.

2. The device according to claim 1, wherein the insulating body is seated against one of the end laminations of the stack of laminations of the stator.

3. The device according to claim 2, wherein the retaining bore is axially provided in the stack of laminations of the stator, externally to the coil windings.

4. The device according to claim 1, wherein the retaining bore presents a diameter smaller than the diameter of the projection containing extensions of the external circumferential ribs.

5. The device according to claim 4, wherein the extensions of the external circumferential ribs are parallel and aligned to each other, and resiliently flexible for introduction into the retaining bore.

6. The device according to claim 1, wherein the support stop is fastened to the coil windings.

7. The device according to claim 1, wherein the support stop is a rear projection of an upper portion of the electric insulating body.

8. The device according to claim 7, wherein the electric insulating body is provided with at least one front flange defining a guide to be seated against an adjacent external wall portion of the stack of laminations of the stator.

* * * * *